(12) United States Patent
Eke

(10) Patent No.: US 7,227,109 B2
(45) Date of Patent: Jun. 5, 2007

(54) MICROWAVE OVENS

(75) Inventor: Kenneth Ian Eke, Franklin, TN (US)

(73) Assignee: Microwave Ovens Limited, Surrey (GB)

(*) Notice: Subject to any disclaimer, the term of this patent is extended or adjusted under 35 U.S.C. 154(b) by 0 days.

(21) Appl. No.: 10/528,517

(22) PCT Filed: Sep. 5, 2003

(86) PCT No.: PCT/GB03/03849

§ 371 (c)(1),
(2), (4) Date: Oct. 3, 2005

(87) PCT Pub. No.: WO2004/032570

PCT Pub. Date: Apr. 15, 2004

(65) Prior Publication Data

US 2006/0081620 A1    Apr. 20, 2006

Related U.S. Application Data

(66) Substitute for application No. 60/416,347, filed on Oct. 4, 2002.

(51) Int. Cl.
*H05B 6/74* (2006.01)
(52) U.S. Cl. ..................... 219/746; 219/745
(58) Field of Classification Search ............. 219/746, 219/745, 747, 749, 748, 756, 763; *H05B 6/74*
See application file for complete search history.

(56) References Cited

U.S. PATENT DOCUMENTS

| | | | | |
|---|---|---|---|---|
| 5,961,871 A | * | 10/1999 | Bible et al. | 219/709 |
| 6,452,142 B2 | * | 9/2002 | Eke | 219/746 |
| 6,462,320 B1 | * | 10/2002 | Fuls et al. | 219/700 |
| 6,686,575 B2 | * | 2/2004 | Kim | 219/751 |
| 6,852,263 B2 | * | 2/2005 | Kuroyanagi et al. | 264/272.13 |
| 6,875,970 B2 | * | 4/2005 | Kim | 219/746 |
| 6,909,077 B2 | * | 6/2005 | Eke et al. | 219/746 |

* cited by examiner

*Primary Examiner*—Daniel Robinson
(74) *Attorney, Agent, or Firm*—Barnes & Thornburg, LLP

(57) ABSTRACT

The oven cavity (1) of a microwave oven includes an apertured launch wall (3) on the external side of which a launch box (5) is mounted so as to cover the aperture. Two three or four magnetrons supply microwave energy to the launch box (5), and hence into the oven cavity, via corresponding waveguides (10a, 10b, 10c) each in communication with a respective side of the launch box (5). In another aspect of the invention, a microwave oven cavity (1) includes an apertured launch wall (3), means for supplying microwave energy to the cavity (1) through the aperture and a match plate (26) mounted in the cavity so as to be spaced a small distance from the launch wall (3) and in registration with the aperture. The match plate and the launch wall (3), define a slot for coupling microwave energy into the cavity (1), and at least one hole (27) in the match plate (26), in use, enables microwave energy to be coupled to resonant modes in the centre of the cavity.

20 Claims, 10 Drawing Sheets

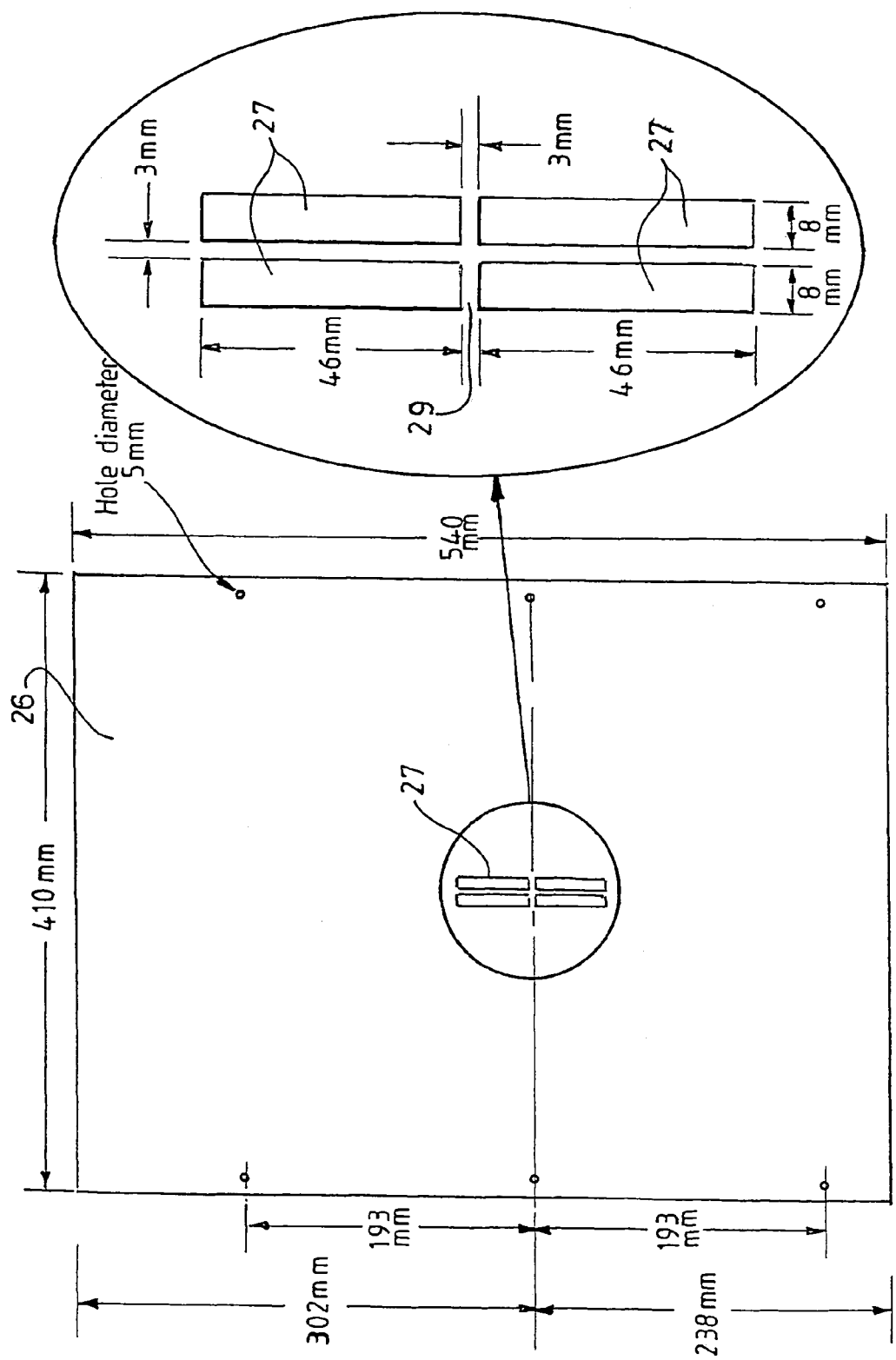

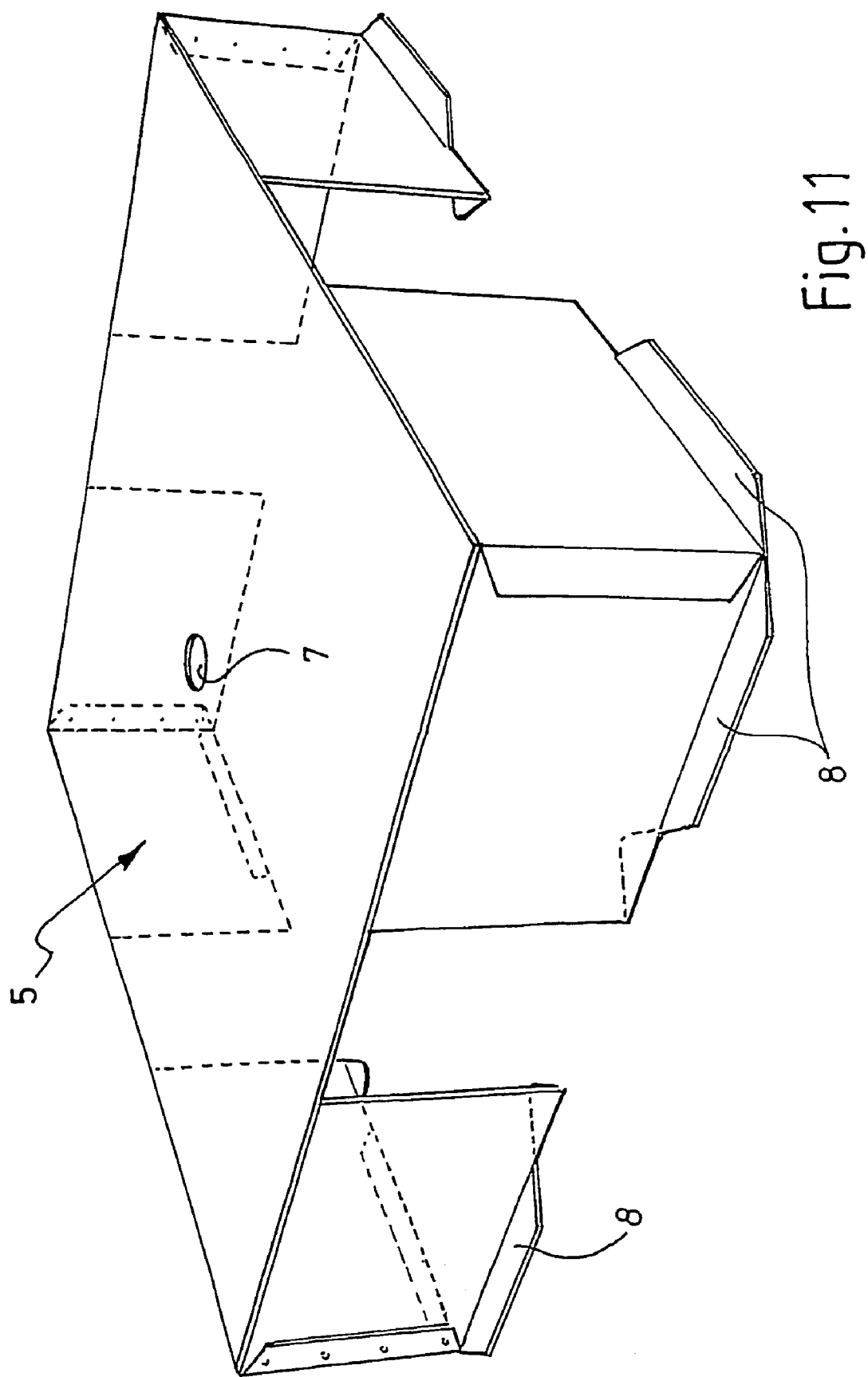

MICROWAVE OVENS

This application claims priority to U.S. Provisional Application No. 60/416,347, filed Oct. 4, 2002.

FIELD OF THE INVENTION

This invention relates to microwave ovens.

BACKGROUND OF THE INVENTION

The inventive work covered in this application was carried out to facilitate the cooking of fairly large loads in commercial microwave ovens, but it is thought that the inventive work will also have application to microwave ovens of smaller size, e.g. for domestic use.

SUMMARY OF THE INVENTION

According to one aspect of the invention there is provided a microwave oven having wall means defining an oven cavity to receive food to be cooked, the wall means having a launch wall with an aperture therein; a launch box mounted on the external side of the launch wall so as to cover the aperture; two, three or four sides of the box being in respective communication with two, three or four waveguides each fed by a respective magnetron so that there are two, three or four magnetrons all operative to supply microwave energy through the common launch box and thence into the oven cavity.

The launch box preferably houses a rotatable phase modulator which is conveniently in the form of a bladed disc designed so that the impedance seen by each magnetron is different at each rotatable position of the modulator so that at no time is the same frequency generated by more than one magnetron. This means that, with both or all magnetrons operating at the same time and the phase modulator rotating at a comparatively high speed, the oven is able to generate a large range of frequencies in the oven cavity simultaneously. This, coupled with the fact that two, three or four magnetrons operating simultaneously provide high power into the cavity, make it possible to cook large loads (for example twenty chickens) in commercial size microwave ovens.

In a preferred embodiment, the launch box is of cuboid shape to three side walls of which are respectively fitted three waveguides respectively fed by three magnetrons. In this case, two of the three waveguides are attached to opposite side walls of the box and have a longer length than the third waveguide which is attached to the intermediate wall of the box. The pair of longer waveguides may have an effective length corresponding to one wavelength at the operating frequency of the magnetron and the shorter waveguide may have an effective length corresponding to one half wavelength at this frequency.

A choke assembly is preferably attached to the launch box. The choke assembly conveniently includes a fixed structure having two annular members attached together at their rims and being dished so as to enclose a space accommodating a fixed attenuator tube and a fixed half wavelength plate, with one of the two annular members being attached, e.g. by welding, to the launch box so that this annular member is in registration with the aperture in the launch wall. A rotatable part of the choke assembly may include a rotatable choke plate spaced from the half wavelength plate and mounted on the shaft of an electric motor which drives not only the choke plate but also the rotatable phase modulator housed in the launch box. For this purpose, the drive shaft preferably extends from the motor, through the choke plate (which is attached to the shaft to rotate therewith) and thence through the stationary half wavelength plate and the attenuator tube so as to project into the launch box where the phase modulator is attached to the extreme end of the shaft.

The phase modulator may have a planar hub region which occupies a main plane of the modulator and from which project equi-angularly spaced blades (e.g. seven in number) each carrying a flange bent so as to project from one side of the main plane of the phase modulator. Further flanges (e.g. three in number) may project from the other side of the main plane, with the object of providing the phase modulator with a shape which contributes to the establishment of multimodes in the oven cavity.

According to another aspect of the invention there is provided a microwave oven having wall means defining an oven cavity to receive food to be cooked, the wall means having a launch wall with an aperture therein, launch means for supplying microwave energy to the cavity through the aperture, a match plate mounted in the cavity so as to be spaced a small distance from the launch wall and in registration with the aperture so that the gap defined between the edges of the match plate and the launch wall define a slot for coupling microwave energy into the cavity, wherein the match plate has at least one hole therein, with the edge of the hole providing a means for coupling microwave energy to resonant modes in the central region of the oven cavity.

To achieve this latter purpose, the hole (or holes) may be formed in a region of the match plate which region is interposed between the central region of the oven cavity and the central region of the launch box. Preferably said region of the match plate is of rectangular shape. In a preferred embodiment, a generally central region of the match plate has four holes, each in the form of a cut out in the match plate, the four cut outs being arranged in a compact symmetrical two-by-two rectangular array. The holes in the match plate may differ in shape and number, to secure the purpose of ensuring that the slot edges act to couple microwave energy into resonance modes in the central region of the cavity. Preferably, however, the or each hole is of a rectangular shape.

The preferred embodiment of the oven conforms to both aspects of the invention.

BRIEF DESCRIPTION OF THE DRAWINGS

A microwave oven according to the invention, together with a modified construction, will now be described, by way of example, with reference to the accompanying drawings, in which:

FIG. 8 illustrates a match plate of the oven, FIG. 9 shows, to an enlarged scale, part of FIG. 8, FIG. 10 corresponds to FIG. 3 but illustrates the modification, and FIG. 11 corresponds to FIG. 4 but illustrates the modification.

DETAILED DESCRIPTION

Figure 1:
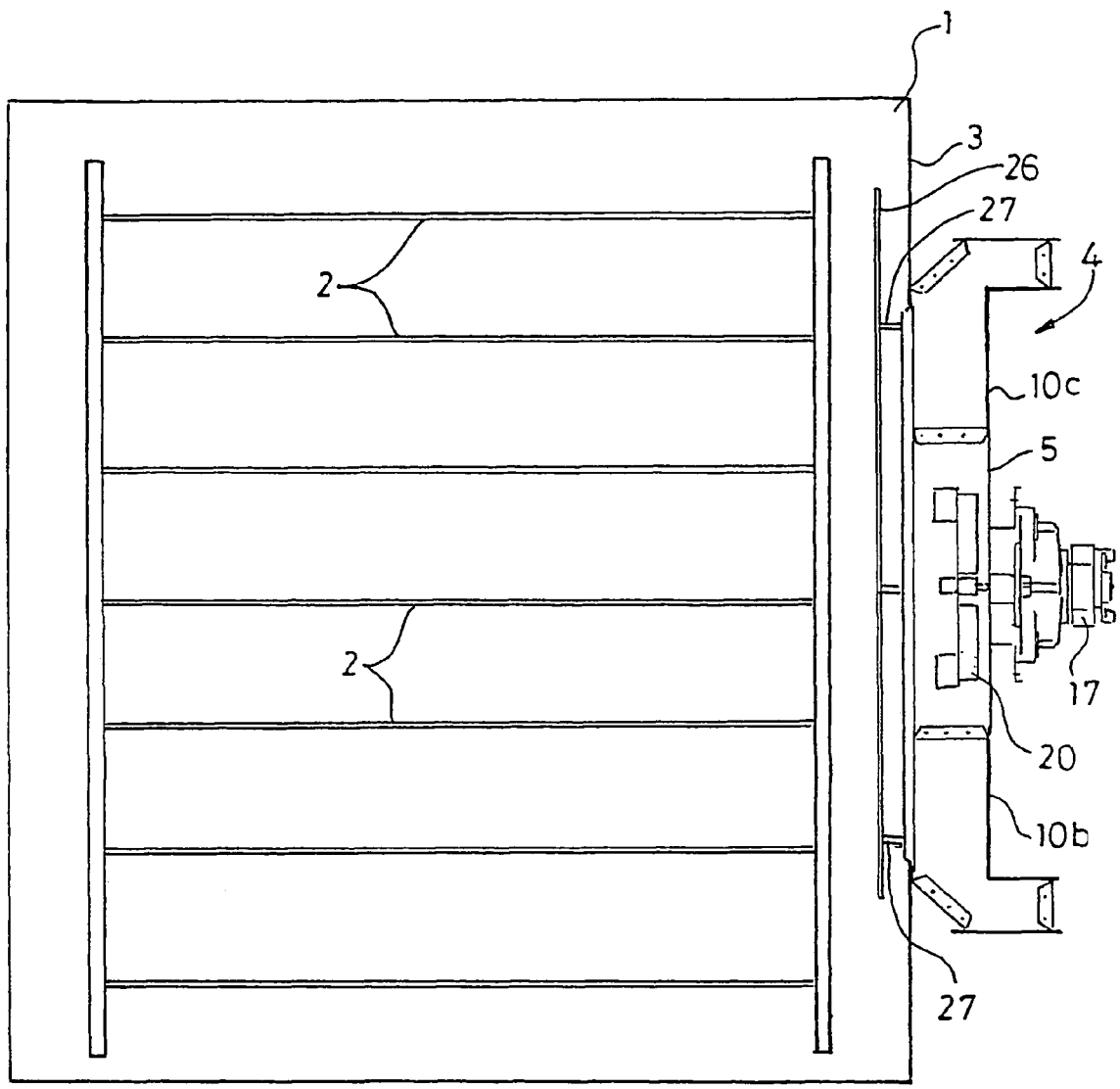
FIG. 1 is a front view of the oven.

Referring to FIG. 1, the microwave oven has two side walls, a top wall, a bottom wall, a back wall and a front door (not shown) which together enclose an oven cavity 1 to receive food to be cooked. The cavity has a height of 740 mm and a width of 650 mm. The cavity holds seven horizontally slideable shelves 2 for supporting food items to be cooked. One side wall 3 serves as a launch wall and has therein a rectangular aperture (200 mm wide by 210 mm high) and to this side wall 3 is attached a launch sub-assembly 4 for delivering microwave energy to the oven cavity. A panel of mica extends across the aperture in the wall 3.

Figure 4:
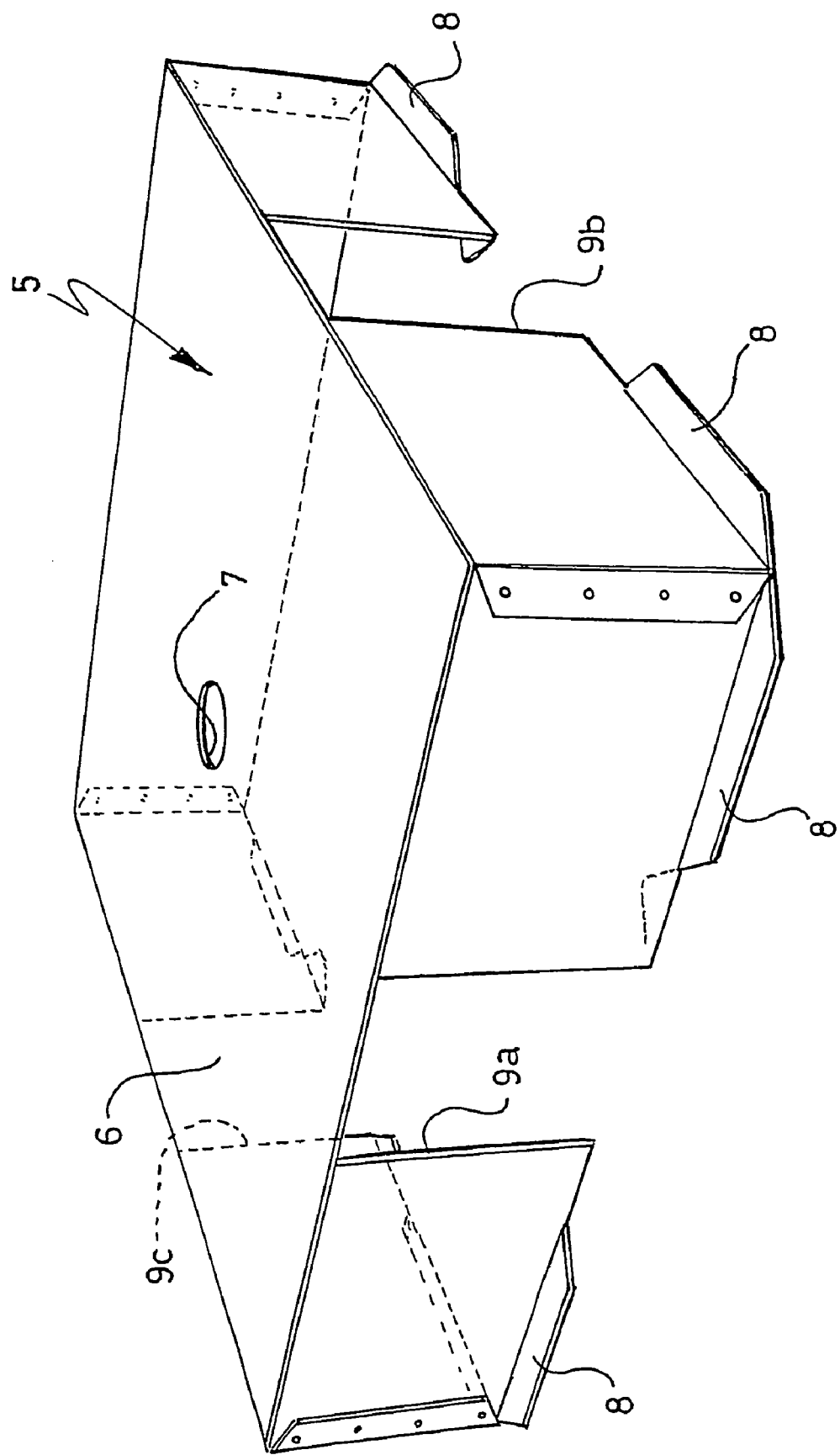
FIG. 4 is a perspective view of a launch box of the oven of FIG. 1, FIGS. 5 and 6 show, in sectional view, two waveguides of the oven of FIG. 1.
Figure 5:
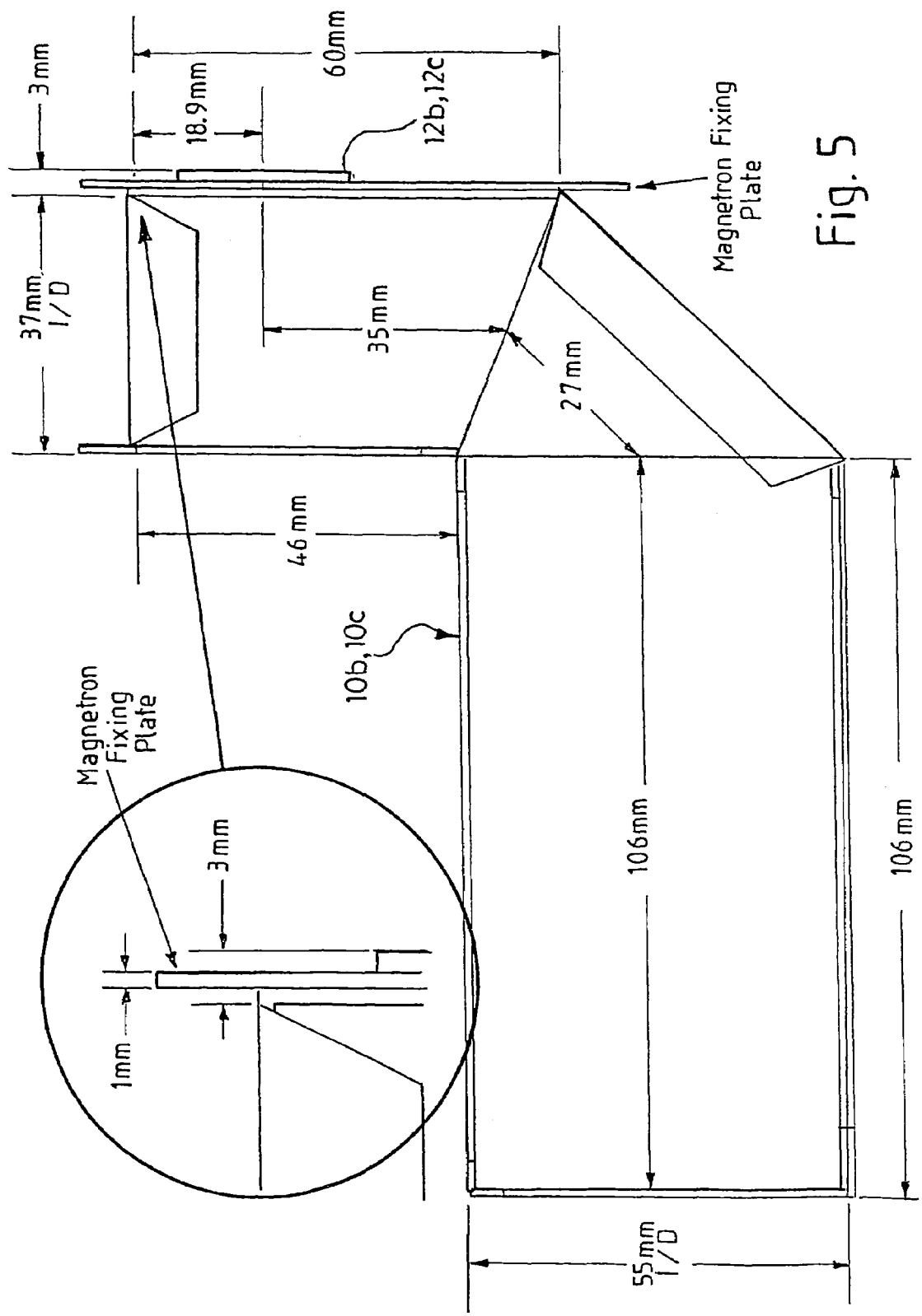
Figure 6:
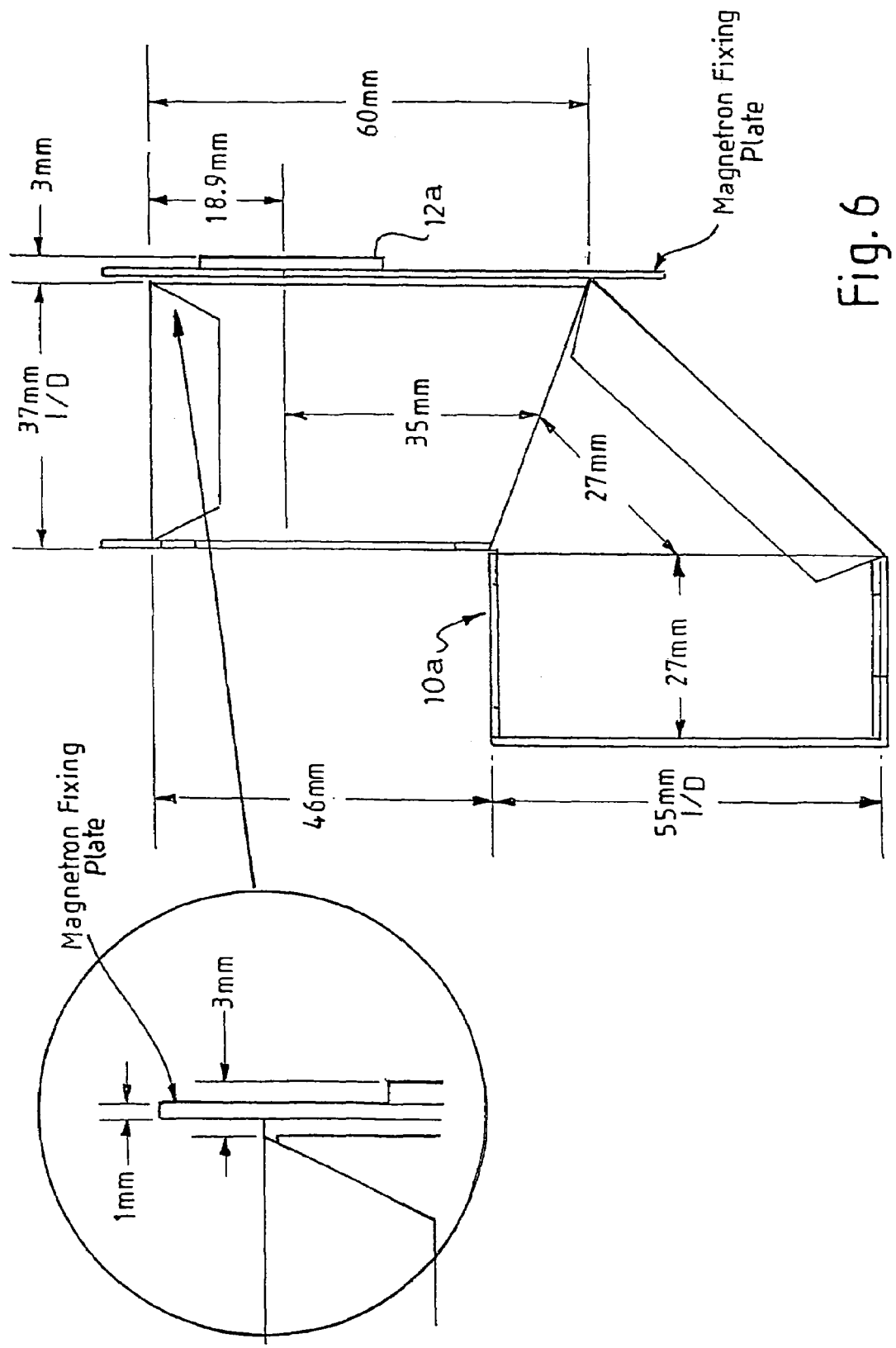

The launch sub-assembly includes a metal launch box 5 which, as viewed in FIG. 4, is open on its underside and has a top wall 6 with a central hole 7 and four side walls terminating in out-turned flanges 8 for securing the launch box 5 to the launch wall so as to cover the rectangular aperture in the wall 3. Three of the side walls of the box 5 have slots 9a, 9b, 9c which register with the open ends of respective metal waveguides 10a, 10b, 10c. The two waveguides 10b, 10c which are attached to mutually opposite side walls of the bar 5 have an effective length corresponding to one wavelength at the operating frequency of the corresponding magnetron and each of these waveguides is shown in side view in FIG. 5. The third waveguide 10a, shown in FIG. 6, has an effective length corresponding to half a wavelength at the operating frequency of the corresponding magnetron. The upstream end of each waveguide has a circular iris 12a, 12b, 12c through which microwave power is delivered by a corresponding magnetron, not shown in the drawings. Thus, there are three magnetrons respectively supplying the three waveguides which in turn deliver microwave energy to the common launch box 5 which supplies microwave energy to the oven cavity 1.

Figure 2:
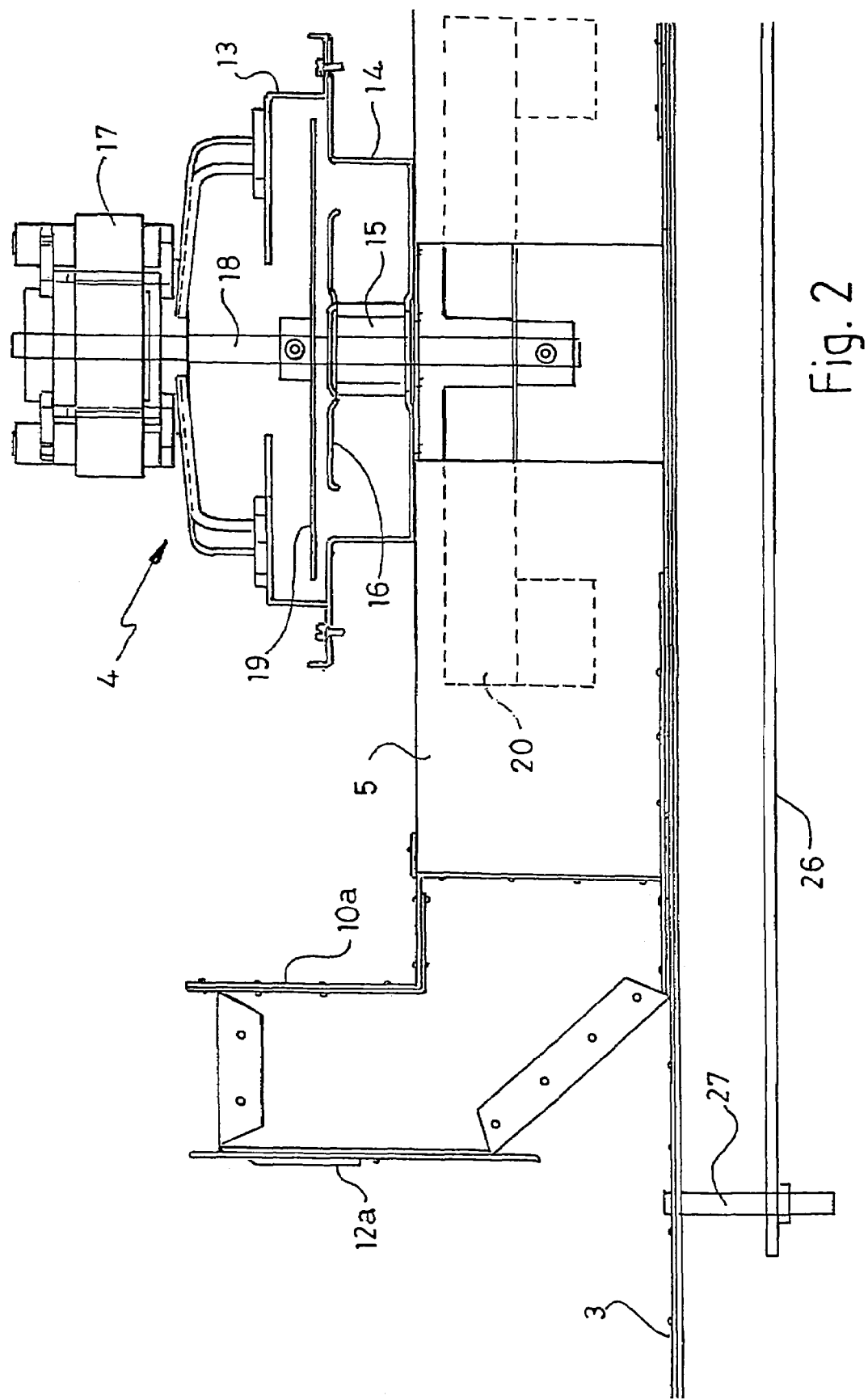
FIG. 2 is a fragmentary view, to an enlarged scale, showing part of the oven of FIG. 1.
Figure 3:
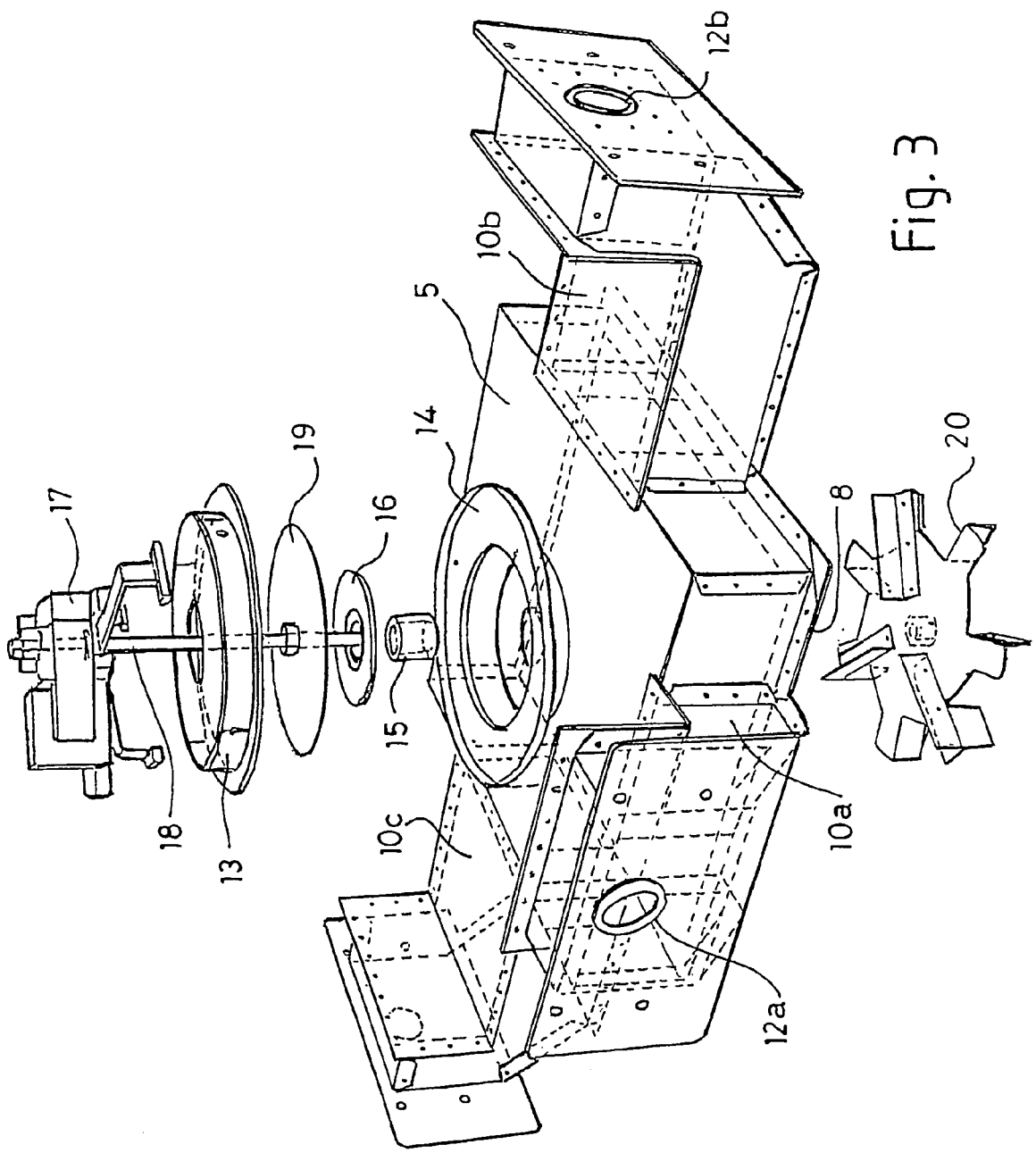
FIG. 3 shows certain parts of the oven of FIG. 1 in exploded view.

FIG. 2 is a section of a plane at right angle to that of FIG. 1, so FIG. 2 illustrates the waveguide 10a.

To the external surface of the wall 6 of the box 5 is attached a choke and phase modulator sub-assembly. This includes two annular members in the form of a choke casing 13 and a choke ditch 14 attached together at their rims and being dished so as to enclose a space accommodating an attenuation tube 15 and a half wavelength plate 16, these two components being fixed in the space. A central dished region of the choke ditch 14 is attached to the wall 6 and insulation may be provided to cover the remainder of the wall 6 of the box 5. The choke and phase modulator sub-assembly includes an electric motor 17 the drive shaft 18 of which carries a rotating choke plate 19. The shaft 18 extends through the half wavelength plate 16, the attenuation tube 15 and thence through the hole 7 in the box where the extremity of the drive shaft 18 carries a rotatable phase modulator 20.

Figure 7:
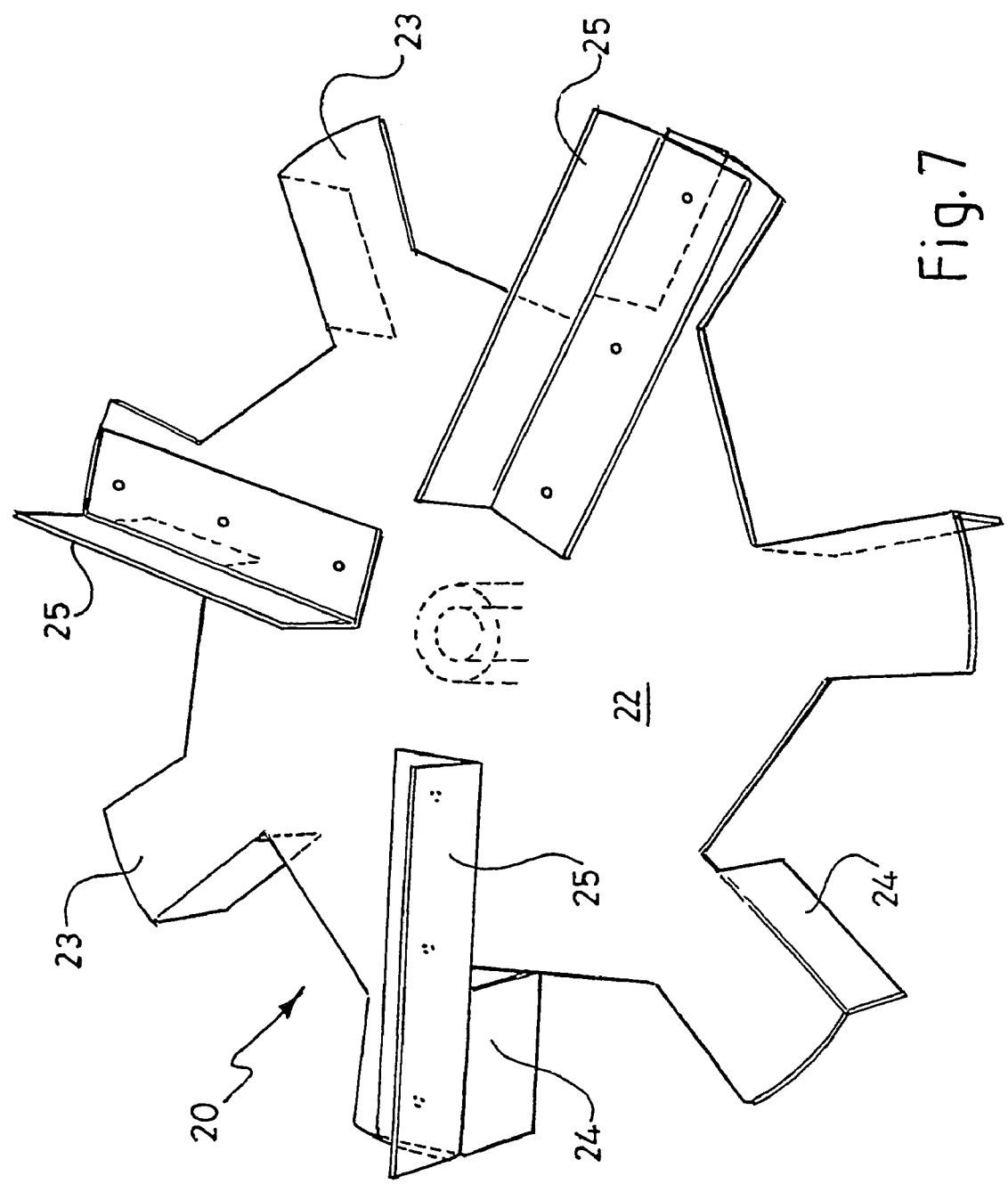
FIG. 7 shows a rotatable phase modulator of the oven.

The modulator 20, best shown in FIG. 7, has a planar hub 22 from which project seven equi-angularly spaced fingers or blades 23 each of which has, on its trailing edge, a projecting flange 24, with all the flanges 24 projecting from one side of the planar hub 22. From the other side of the hub 22 project the flanges 25 of three right-angled strips of metal, these three flanges being spaced at 90° to one another around the rotational axis of the modulator 20.

Inside the oven cavity 1, a match plate 26 is supported from the side wall 3 by means of spacer supports 27. The match plate 26 is a rectangular sheet of metal shown in FIG. 8. The match plate 26 is parallel to the wall 3 and overlaps the rectangular aperture in the wall 3. At a position offset from its centre by 32 mm, the match plate 26 has four holes 27 arranged in a symmetrical two-by-two array, as shown in detail in FIG. 9. The apertures 27 are spaced apart by a cruciform portion 29 of the match plate 26. The apertures 27 are also interposed between the central regions of the oven and the launch box 5 so that the centre of the portion 29 lies on the axis of the shaft 18, that axis passing through the centres of the oven and the launch box 5.

In operation of the oven shown in FIGS. 1 to 9, the three magnetrons are energised simultaneously and microwave energy is fed through the three waveguides 10a, 10b, 10c, through the launch box 5 and is then coupled through the slot defined between the edges of the match plate 26 and the side wall 3 so as to reach the oven cavity. Also, the electric motor 17 is energised to rotate the shaft 18 which in turn rotates the plate 19 and also the phase modulator 20 within the launch box 5. The simultaneous operation of the three magnetrons, combined with the rotation of the phase modulator 20, causes a large range of frequencies to be generated simultaneously in the oven cavity 1, so that a large amount of power is delivered to the oven cavity rendering it suitable for commercial cooking purposes.

The match plate 26 couples to a large number of modes in the cavity. First, the slot defined between the match plate 26 and the side wall 3 couples to a large number of modes in the cavity. In addition, the edges of the holes 27 in the match plate 26 couple to the many mode resonances that are positioned in the central region of the cavity. But for the holes 27 in the match plate 26, these mode resonances in a central region of the oven would not have microwave energy coupled to them.

Figure 10:
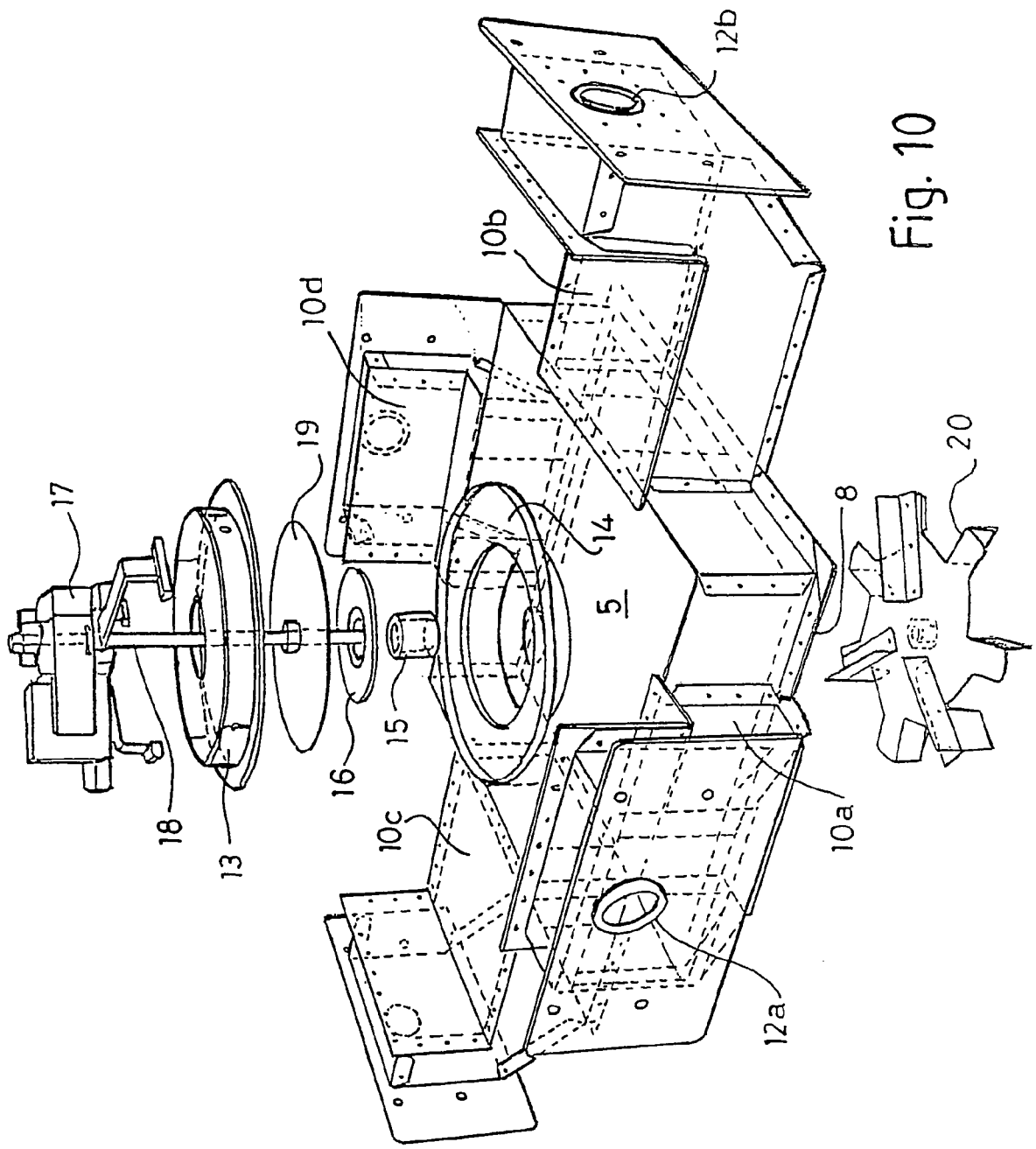

The oven illustrated in FIGS. 1 to 9 has three magnetrons. The modification shown in FIGS. 10 and 11 has four magnetrons respectively feeding into four waveguides 10a, 10b, 10c, 10d respectively attached to the four side walls of the box. Thus, the box 5 is slotted on each of its four side walls, as illustrated in FIG. 11, the extra waveguide rod being a half length waveguide having the form shown in FIG. 6. The modified oven of FIGS. 10 and 11 is otherwise the same as the oven of FIGS. 1 to 9, corresponding parts bearing the same reference numerals. The modification shown in FIGS. 10 to 11 offers the possibility of coupling even more power into the oven cavity than for the three-magnetron arrangement shown in FIGS. 1 to 9.

The invention claimed is:

1. A microwave oven having wall means defining an oven cavity to receive food to be cooked, the wall means having a launch wall with an aperture therein; a launch box mounted on the external side of the launch wall so as to cover the aperture; three sides of the box being in respective communication with three waveguides each fed by a respective magnetron so that there are three magnetrons all operative to supply microwave energy through the common launch box and the common aperture and thence into the oven cavity, wherein the launch box is of cuboid shape to three side walls of which are respectively fitted the three waveguides respectively fed by the three magnetrons, wherein the launch box has two opposite side walls and in intermediate side wall, and in which two of the three waveguides are attached to opposite side walls of the box and have a longer length than the third waveguide which is attached to the intermediate wall of the box, and wherein the pair of longer waveguides each have an effective length corresponding to one wavelength at the operating frequency of the corresponding magnetron and the shorter waveguide has an effective length corresponding to one half wavelength at the corresponding frequency.

2. A microwave oven according to claim 1, in which the launch box houses a rotatable phase modulator designed so that the impedance seen by each magnetron is different at each rotatable position of the modulator so that at no time is the same frequency generated by more than one magnetron.

3. A microwave oven according to claim 2, in which the rotatable phase modulator comprises a bladed disc.

4. A microwave oven according to claim 1, in which a choke assembly is attached to the launch box.

5. A microwave oven according to claim 4, in which the choke assembly includes a fixed structure having two annular members attached together at their rims and being dished so as to enclose a space accommodating a fixed attenuator tube and a fixed half wavelength plate, with one of the two annular members being attached to the launch box so that this annular member is in registration with the aperture in the launch wall.

6. A microwave oven according to claim 5, in which, the choke assembly has a rotatable part which includes a rotatable choke plate spaced from the half wavelength plate and mounted on the shaft of an electric motor which drives not only the choke plate but also a rotatable phase modulator housed in the launch box.

7. A microwave oven according to claim 6, in which the drive shaft extends from the motor, through the choke plate and thence through the stationary half wavelength plate and the attenuator tube so as to project into the launch box where the phase modulator is attached to the extreme end of the shaft.

8. A microwave oven according to claim 2, in which the phase modulator has a planar hub region which occupies a main plane of the modulator and from which project equiangularly spaced blades each carrying a flange bent so as to project from one side of the main plane of the phase modulator.

9. A microwave oven according to claim 8, in which further flanges project from the other side of the main plane, with the object of providing the phase modulator with a shape which contributes to the establishment of multi-modes in the oven cavity.

10. A microwave oven according to claim 1, wherein a match plate is mounted in the cavity so as to be spaced a small distance from the launch wall and in registration with the aperture so that the gap defined between the edges of the match plate and the launch wall has at least one hole therein, with the edge of the hole providing a means for coupling microwave energy to resonant modes in the central region of the oven cavity.

11. A microwave oven according to claim 10, in which each hole is formed in a region of the match plate which region is interposed between the central region of the oven cavity and the central region of the launch box.

12. A microwave oven according to claim 11, in which said region of the match plate is of rectangular shape.

13. A microwave oven according to claim 11, in which a generally central region of the match plate has four holes, each in the form of a cut out in the match plate, the four cut outs being arranged in a symmetrical two-by-two rectangular array.

14. A microwave oven according to claim 10, in which each hole is of a rectangular shape.

15. A microwave oven having wall means defining an oven cavity to receive food to be cooked, the wall means having a launch wall with an aperture therein; a launch box mounted on the external side of the launch wall so as to cover the aperture; two, three or four sides of the box being in respective communication with two, three or four waveguides each fed by a respective magnetron so that there are two, three or four magnetrons all operative to supply microwave energy through the common launch box and thence into the oven cavity, wherein a choke assembly is attached to the launch box, and wherein the choke assembly includes a fixed structure having two annular members attached together at their rims and being dished so as to enclose a space accommodating a fixed attenuator tube and a fixed half wavelength plate, with one of the two annular members being attached to the launch box so that this annular member is in registration with the aperture in the launch wall.

16. A microwave oven according to claim 15, wherein a match plate is mounted in the cavity so as to be spaced a small distance from the launch wall and in registration with the aperture so that the gap defined between the edges of the match plate and the launch wall has at least one hole therein, with the edge of the hole providing a means for coupling microwave energy to resonant modes in the central region of the oven cavity.

17. A microwave oven according to claim 16, in which each hole is formed in a region of the match plate which region is interposed between the central region of the oven cavity and the central region of the launch box.

18. A microwave oven according to claim 17, in which said region of the match plate is of rectangular shape.

19. A microwave oven according to claim 17, in which a generally central region of the match plate has four holes, each in the form of a cut out in the match plate, the four cut outs being arranged in a symmetrical two-by-two rectangular array.

20. A microwave oven having wall means defining an oven cavity to receive food to be cooked, the wall means having a launch wall with an aperture therein; a launch box mounted on the external side of the launch wall so as to cover the aperture; four sides of the box being in respective communication with four waveguides each fed by a respective magnetron so that there are four magnetrons all operative to supply microwave energy through the common launch box and the common aperture and thence into the oven cavity, wherein the launch box is of cuboid shape to four side walls of which are respectively fitted the four waveguides respectively fed by the four magnetrons, wherein the launch box has a first pair of opposite side walls and a second pair of opposite side walls and in which two of the four waveguides are respectively attached to the first pair of opposite side walls of the box and have a longer length than the two remaining waveguides which are respectively attached to the second pair of opposite walls of the box, and wherein the pair of longer waveguides each have an effective length corresponding to one wavelength at the operating frequency of the corresponding magnetron and each of the shorter waveguides has an effective length corresponding to one half wavelength at the corresponding frequency.

* * * * *